(12) United States Patent
Hong et al.

(10) Patent No.: US 12,104,588 B2
(45) Date of Patent: Oct. 1, 2024

(54) LOW HYSTERESIS PIEZO-ELECTRIC PUMP

(71) Applicant: PROTEC CO., LTD., Gyeonggi-do (KR)

(72) Inventors: Seung Min Hong, Seoul (KR); Eui Keun Choi, Seoul (KR); Keon Hee Kim, Incheon (KR)

(73) Assignee: PROTEC CO., LTD., Gyeonggi-do (KR)

( * ) Notice: Subject to any disclaimer, the term of this patent is extended or adjusted under 35 U.S.C. 154(b) by 121 days.

(21) Appl. No.: 17/950,072

(22) Filed: Sep. 21, 2022

(65) Prior Publication Data

US 2023/0204028 A1  Jun. 29, 2023

(30) Foreign Application Priority Data

Dec. 29, 2021 (KR) .................. 10-2021-0191188

(51) Int. Cl.
*F04B 49/06* (2006.01)
*F04B 17/03* (2006.01)
*F16K 31/00* (2006.01)

(52) U.S. Cl.
CPC .............. *F04B 49/06* (2013.01); *F04B 17/03* (2013.01); *F16K 31/004* (2013.01)

(58) Field of Classification Search
CPC ........ F04B 49/06; F04B 17/03; F04B 17/003; F16K 31/004
See application file for complete search history.

(56) References Cited

U.S. PATENT DOCUMENTS

| | | | |
|---|---|---|---|
| 5,733,597 A | 3/1998 | Schmitkons et al. | |
| 9,144,818 B2 | 9/2015 | Doyle et al. | |
| 9,429,368 B2 | 8/2016 | Hong et al. | |
| 9,443,188 B2 | 9/2016 | Hong et al. | |
| 9,573,157 B2 | 2/2017 | Hong et al. | |
| 9,636,699 B2 | 5/2017 | Doyle et al. | |
| 10,328,449 B2 | 6/2019 | Hong et al. | |
| 2013/0026197 A1 | 1/2013 | Felix et al. | |
| 2014/0263688 A1 | 9/2014 | Doyle et al. | |
| 2015/0300748 A1* | 10/2015 | Hong ...................... F04B 13/00 165/287 |
| 2015/0302292 A1 | 10/2015 | Hong et al. | |
| 2015/0367376 A1 | 12/2015 | Doyle et al. | |
| 2016/0136661 A1* | 5/2016 | Hong ................... B05C 5/0225 239/1 |
| 2021/0154688 A1* | 5/2021 | Qu ........................... F16K 1/00 |

FOREIGN PATENT DOCUMENTS

KR    101301107    8/2013

\* cited by examiner

*Primary Examiner* — Daphne M Barry
(74) *Attorney, Agent, or Firm* — JCIPRNET

(57) ABSTRACT

A low hysteresis piezo-electric pump using a piezo-electric element as an actuator to dispense a liquid may maintain accurate viscous liquid discharge characteristics by adjusting an applied voltage in response to changes in behavioral characteristics of a piezo-electric actuator depending on causes such as temperature change.

5 Claims, 3 Drawing Sheets

LOW HYSTERESIS PIEZO-ELECTRIC PUMP

CROSS-REFERENCE TO RELATED APPLICATION

This application is based on and claims priority under 35 U.S.C. § 119 to Korean Patent Application No. 10-2021-0191188, filed on Dec. 29, 2021, in the Korean Intellectual Property Office, the disclosure of which is incorporated by reference herein in its entirety.

BACKGROUND

1. Field

The present disclosure relates to a low hysteresis piezo-electric pump, and more particularly, to a low hysteresis piezo-electric pump using a piezo-electric element as an actuator to dispense a liquid.

2. Description of the Related Art

A dispenser that supplies an exact amount of a viscous liquid such as water, oil, or resin is used in various fields such as semiconductor process and medical field.

In particular, in the case of the semiconductor process, the dispenser is often used in underfill process, and the dispenser is also widely used to fill an inside of a package of a semiconductor device with resin. In a process of manufacturing a light emitting diode (LED) device, the dispenser is used in a process of applying a phosphor mixed with a fluorescent material and a resin in the LED device to a LED chip.

In such the dispenser, a pump that dispenses an exact amount of a supplied liquid at an accurate position is used as a key device.

There are various types of pump structures such as screw pumps and linear pumps. Recently, in order to perform dispensing at high speed, a piezo-electric pump using a piezo-electric element as an actuator has been developed and used in the semiconductor process.

Korean Patent Registration No. 1301107 (registered on Aug. 14, 2013) discloses a piezo-electric pump including a pump body and a valve body, which are separably coupled to each other. A hinge axis is installed on the pump body, and a lever extending in a horizontal direction is rotatably installed with respect to the hinge axis. A valve rod extending in a vertical direction is installed on the valve body. The lever and the valve rod are connected to each other, so that the valve rod moves up and down when the lever rotates about the hinge axis. A pair of piezo-electric actuators are installed on the pump body to rotate the lever relative to the hinge axis. Each of the pair of piezo-electric actuators is composed of a piezo-electric element whose length increases or decreases depending on a potential of an applied voltage.

The piezo-electric actuator used in such the piezo-electric pump is generally made of ceramic from lead zirconium titanate (PZT). Such the piezo-electric actuator generates heat during use and increases its temperature. However, when the temperature of the piezo-electric actuator increases as described above, behavioral characteristics of the piezo-electric actuator change. Therefore, even though the applied voltage driving the piezo-electric actuator is set according to working conditions, if the temperature of the piezo-electric actuator rises during the work, the performance of the piezo-electric pump changes. In addition, when the temperature of the piezo-electric actuator increases, a hysteresis phenomenon increases, and a correspondence between the applied voltage and an amount of deformation of the piezo-electric actuator changes.

To solve this problem, a piezo-electric pump additionally equipped with a piezo-electric actuator cooling device was developed and used. However, when the cooling device is used, a volume of the piezo-electric pump is increased. In addition, depending on the type of cooling device, there is a limit in maintaining the temperature of the piezo-electric pump constant, so it is difficult to maintain the performance of the pump. In the case of cooling using a liquid such as water cooling, there is a risk of process failure due to leakage of cooling liquid.

Therefore, there is a need for a low hysteresis piezo-electric pump capable of maintaining the dispensing performance of the piezo-electric pump despite the change in piezo-electric characteristics according to the temperature change of the piezo-electric actuator. In addition, a low hysteresis piezo-electric pump capable of maintaining dispensing performance is required in consideration of the performance change of the piezo-electric actuator within a predetermined temperature range, which inevitably occurs even when the cooling device is used.

SUMMARY

A purpose of the present disclosure is to provide a low hysteresis piezo-electric pump capable of maintaining a discharge performance of a viscous liquid even when characteristics of a piezo-electric actuator change.

Additional aspects will be set forth in part in the description which follows and, in part, will be apparent from the description, or may be learned by practice of the presented embodiments of the disclosure.

A low hysteresis piezo-electric pump from present disclosure includes a pump body; a valve operating member including a lever installed to be rotatable with respect to a hinge axis installed on the pump body, and a valve rod connected to the lever to move up and down according to the rotation of the lever; a piezo-electric actuator installed on the pump body and having an end portion contactable with the lever, wherein the piezo-electric actuator lengthens and presses the lever when voltage is applied to rotate the lever about the hinge axis; a valve body including a reservoir into which an end portion of the valve rod is inserted and a liquid is stored, an inlet through which the liquid is introduced into the reservoir, and a nozzle through which the liquid of the reservoir is discharged according to a forward/backward movement of the valve rod in the reservoir; a displacement detection sensor installed in the piezo-electric actuator to detect an operating displacement of the piezo-electric actuator; and a control unit electrically connected to the piezo-electric actuator and the displacement detection sensor to apply the voltage to operate the piezo-electric actuator and to receive a detection signal on the operating displacement of the piezo-electric actuator from the displacement detection sensor.

In addition, a low hysteresis piezo-electric pump according to the present disclosure includes a pump body; a valve operating member including a lever installed to be rotatable with respect to a hinge axis installed on the pump body, and a valve rod connected to the lever to move up and down according to the rotation of the lever; a pair of piezo-electric actuators installed in parallel with each other on the pump body with the hinge axis interposed therebetween and each having an end portion contactable with the lever, wherein the pair of piezo-electric actuators lengthen and press the lever when voltage is applied to rotate the lever about the hinge axis; a valve body including a reservoir into which an end portion of the valve rod is inserted and a liquid is stored, an inlet through which the liquid is introduced into the reservoir, and a nozzle through which the liquid of the reservoir is discharged according to a forward/backward movement of the valve rod in the reservoir; a pair of displacement detection sensors respectively installed in the pair of piezo-electric actuators to detect operating displacements of the pair of piezo-electric actuators; and a control unit electrically connected to the pair of piezo-electric actuators and the pair of displacement detection sensors to apply the voltage to operate the pair of piezo-electric actuators and to receive detection signals on the operating displacements of the pair of piezo-electric actuators from the pair of displacement detection sensors.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
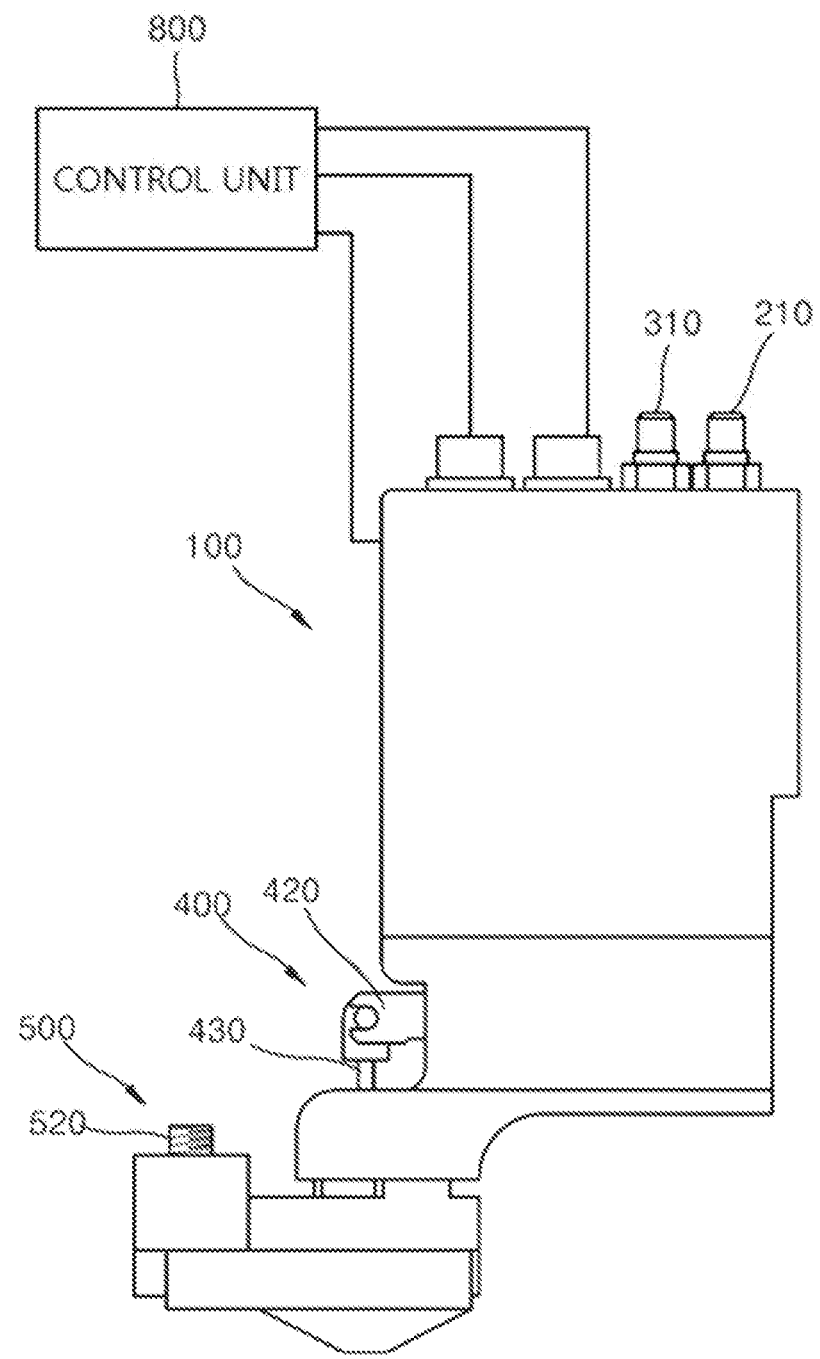
FIG. 1 is a front view of a low hysteresis piezo-electric pump according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a low hysteresis piezo-electric pump according to an embodiment of the present disclosure will be described with reference to the accompanying drawings.

Figure 2:
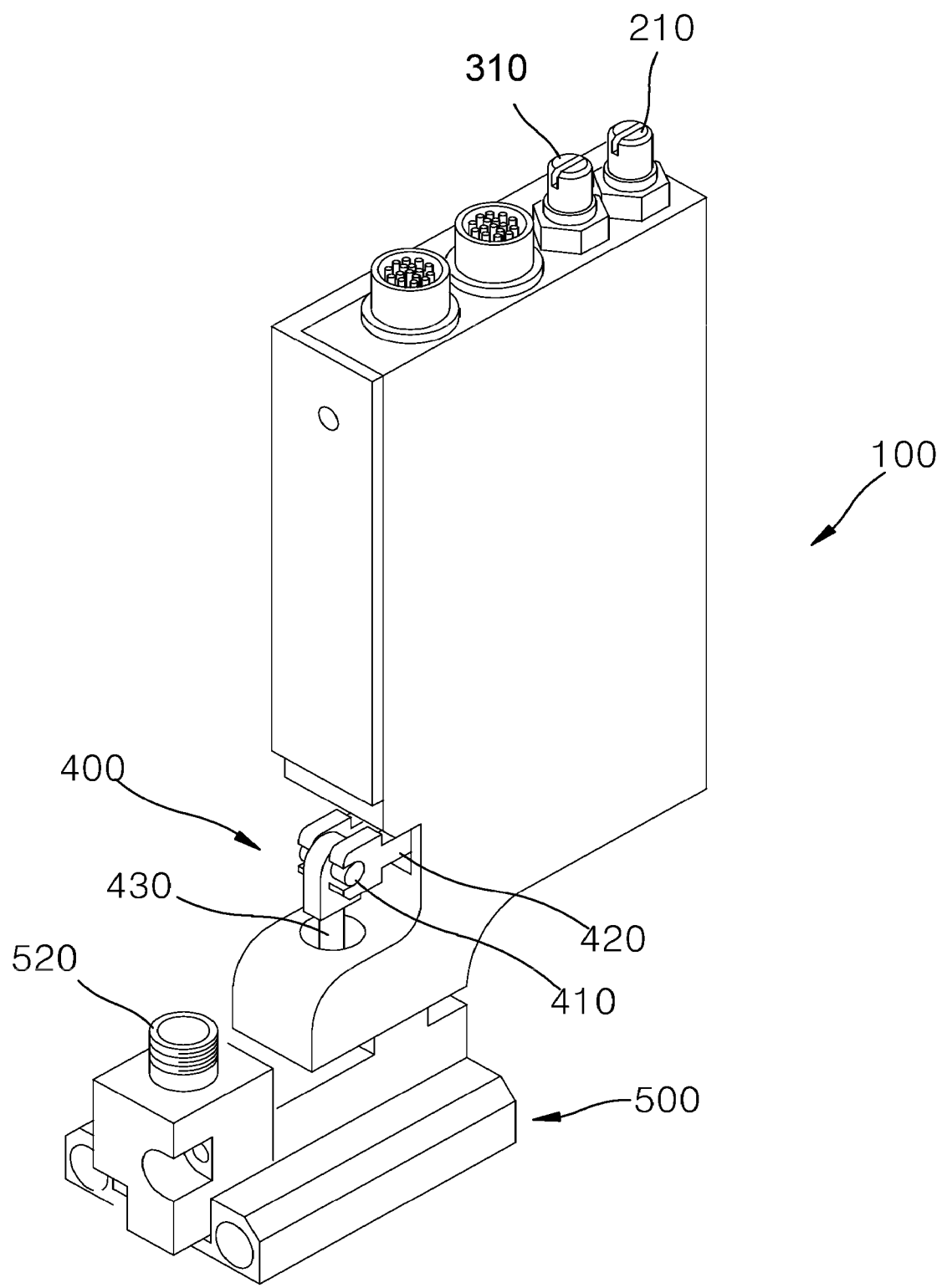
FIG. 2 is a perspective view of the low hysteresis piezo-electric pump illustrated in FIG. 1.
Figure 3:
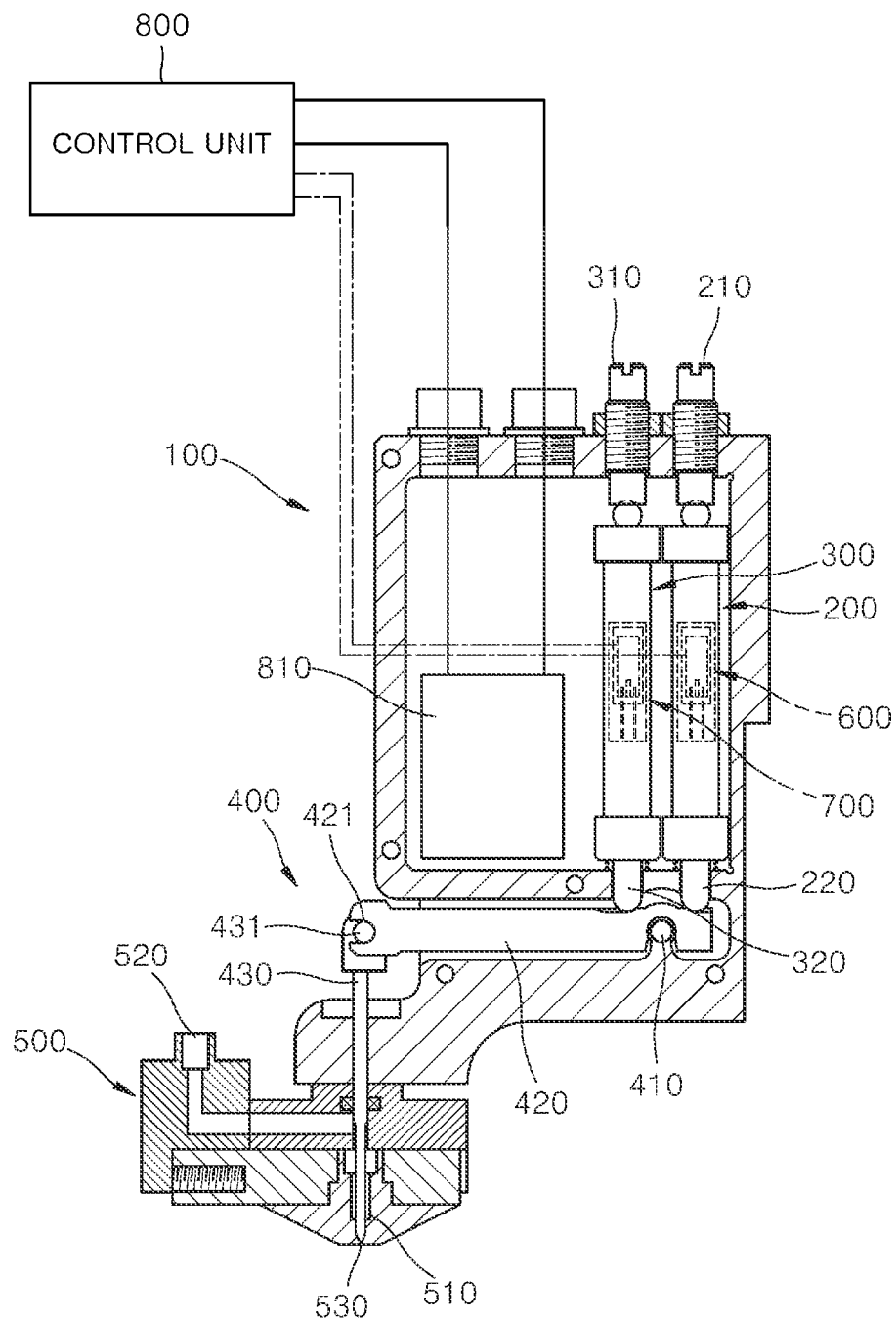
FIG. 3 is a cross-sectional view of the low hysteresis piezo-electric pump illustrated in FIG. 1.

FIG. 1 is a front view of a low hysteresis piezo-electric pump according to an embodiment of the present disclosure, FIG. 2 is a perspective view of the low hysteresis piezo-electric pump illustrated in FIG. 1, and FIG. 3 is a cross-sectional view of the low hysteresis piezo-electric pump illustrated in FIG. 1.

Referring to FIGS. 1 to 3, a low hysteresis piezo-electric pump of this embodiment includes a pump body 100, a pair of piezo-electric actuators 200 and 300, a valve operating member 400, a valve body 500, a pair of displacement detection sensors 600 and 700, a lever displacement sensor 810 and a control unit 800.

The pair of piezo-electric actuators 200 and 300, the valve operating member 400, the pair of displacement detection sensors 600 and 700 and the lever displacement sensor 810 are accommodated inside the pump body 100. The pump body 100 is detachably coupled to the valve body 500 through a fixing member (not illustrated) such as a bolt. Also, the pump body 100 is electrically connected to the control unit 800.

The pair of piezo-electric actuators 200 and 300 are installed on the pump body 100. Each of the pair of piezo-electric actuators 200 and 300 is formed of a piezo-electric element. The length of the piezo-electric elements increases or decreases according to a potential of an applied voltage, which is a voltage applied to the piezo-electric elements, thereby rotating a lever 420 with respect to a hinge axis 410. In this embodiment, the piezo-electric actuators 200 and 300 will be described as an example of a multi-stack type in which a plurality of piezo-electric elements are stacked.

In the low hysteresis piezo-electric pump of this embodiment, the pair of piezo-electric actuators 200 and 300 include a first piezo-electric actuator 200 and a second piezo-electric actuator 300.

The first piezo-electric actuator 200 and the second piezo-electric actuator 300 are arranged side by side in a vertical direction and supported by the pump body 100. The first piezo-electric actuator 200 and the second piezo-electric actuator 300 are arranged so that lower ends 220 and 320 contact an upper surface of the lever 420 with the hinge axis 410 interposed therebetween. Position controllers 210 and 310 are installed at positions corresponding to upper ends of the first piezo-electric actuator 200 and the second piezo-electric actuator 300 in the pump body 100, respectively.

A first position controller 210 and a second position controller 310 are screw-coupled to the pump body 100 in a state in which end portions thereof are in contact with end portions of the first piezo-electric actuator 200 and the second piezo-electric actuator 300, respectively. The first position controller 210 controls a position of the first piezo-electric actuator 200 with respect to the lever 420 and the pump body 100, and the second position controller 310 controls a position of the second piezo-electric actuator 300 with respect to the lever 420 and the pump body 100. That is, when the first position controller 210 is tightened and pressed the first piezo-electric actuator 200, the first piezo-electric actuator 200 descends to be close or in close contact with the lever 420. The second position controller 310 operates in the same way as the first position controller 210.

The valve operating member 400 includes the hinge axis 410, the lever 420 and a valve rod 430. The hinge axis 410 is installed on the pump body 100. The lever 420 extends in a horizontal direction and is rotatably installed on the hinge axis 410. The valve rod 430 extends in the vertical direction and is connected to one end of the lever 420. When the lever 420 rotates with respect to the hinge axis 410, the valve rod 430 moves up and down. The valve rod 430 connected to the lever 420 moves up and down with respect to the reservoir 510 according to the rotation of the lever 420.

The lever 420 and the valve rod 430 may be connected by various methods. In this embodiment, the valve rod is connected to the lever 420 so that the valve rod may moves up and down by being caught on the lever 420. A catching groove 421 opened in the horizontal direction is formed in an end portion of the lever 420. That is, the catching groove 421 of the lever 420 is formed in a "C" shape. A caught protrusion 431 is formed on an upper end of the valve rod 430. The caught protrusion 431 is inserted into the catching groove 421 of the lever 420 so as to be rotatably connected to the lever 420. Since the catching groove 421 is open in the horizontal direction, the caught protrusion 431 moves in the horizontal direction relative to the catching groove 421, so that the catching groove 421 and the caught protrusion 431 may be attached to and detached from each other. In addition, since the catching groove 421 is formed in the horizontal direction, even if the catching groove 421 moves up and down by the rotation of the lever 420, the caught protrusion 431 does not fall out of the catching groove 421 and moves up and down with respect to the valve body 500. When the lever 420 and the valve rod 430 need to be separated from each other, the caught protrusion 431 may be moved horizontally so as to be easily separated from the catching groove 421.

The valve body 500 includes the reservoir 510, an inlet 520 and a nozzle 530. The reservoir 510 is formed in a form of a container that is opened upward. The inlet 520 is connected to the reservoir 510, and delivers a liquid supplied from an outside to the reservoir 510. The valve rod 430 is inserted into the reservoir 510. When the valve rod 430 moves up and down by the valve operating member 400 as described above, the liquid of the reservoir 510 is discharged through the nozzle 530 by a pressure generated by the valve rod 430.

A first displacement detection sensor 600 and a second displacement detection sensor 700 are installed in the first piezo-electric actuator 200 and the second piezo-electric actuator 300, respectively. The first displacement detection sensor 600 and the second displacement detection sensor 700 are arranged along extension directions of the first piezo-electric actuator 200 and the second piezo-electric actuator 300 to detect the operating displacements of the first piezo-electric actuator 200 and the second piezo-electric actuator 300, respectively. In this embodiment, each of the first displacement detection sensor 600 and the second displacement detection sensor 700 is formed of a strain gauge. The strain gauge measures a strain of an object to which the strain gauge is attached. The strain measured by the first displacement detection sensor 600 and the second displacement detection sensor 700 are transmitted to the control unit 800, and the control unit 800 calculates amounts of deformations of the first piezo-electric actuator 200 and the second piezo-electric actuator 300 in consideration of the lengths of the first piezo-electric actuator 200 and the second piezo-electric actuator 300.

The lever displacement sensor 810 measures an operating displacement of the valve operating member 400. For this, the lever displacement sensor 810 is installed on the pump body 100 and connected to the lever 420 of the valve operating member 400. The value measured by the lever displacement sensor 810 is transmitted to the control unit 800. In this embodiment, the lever displacement sensor 810 is formed of a linear variable displacement transducer (LVDT). The linear variable displacement transducer is a mechanical motion sensor that converts mechanical motion or vibration, particularly linear motion, into a variable current, voltage or electrical signal and vice versa.

The control unit 800 applies voltage to actuate the piezo-electric actuators 200 and 300. For this, the control unit 800 includes a power supply. Meanwhile, the control unit 800 receives detection signals on the strain of the first piezo-electric actuator 200 and the second piezo-electric actuator 300 from the first displacement detection sensor 600 and the second displacement detection sensor 700. The control unit 800 converts and calculates the operating displacements of the first piezo-electric actuator 200 and the second piezo-electric actuator 300 based on the strain of the provided piezo-electric actuators 200 and 300. The control unit 800 compares the calculated operating displacements of the first piezo-electric actuator 200 and the second piezo-electric actuator 300 with a preset reference set value, and checks whether the operating displacements of the first piezo-electric actuator 200 and the second piezo-electric actuator 300 are equal to the preset reference set value. When the operating displacements of the first piezo-electric actuator 200 and the second piezo-electric actuator 300 is different from the reference set value, the control unit 800 adjusts the voltage applied to the first piezo-electric actuator 200 and the second piezo-electric actuator 300, so as to adjust the operating displacements of the first piezo-electric actuator 200 and the second piezo-electric actuator 300 to be the same as the preset reference set value.

In addition, the control unit 800 receives a detection signal on the operating displacement of the valve operating member 400 from the lever displacement sensor 810. The control unit 800 compares the provided operating displacements of the valve operating member 400 with a preset reference set value, and determines whether the operating displacements of the valve operating member 400 is equal to or different from the preset reference set value. When the operating displacement of the valve operating member 400 is different from the reference set value, the control unit 800 adjusts and changes the voltage applied to the first piezo-electric actuator 200 and the second piezo-electric actuator 300 so as to adjust the operating displacement of the valve operating member 400 to be the same as the preset reference set value.

On the other hand, when the operating displacements of the two piezo-electric actuators 200 and 300, which are calculated from the pair of displacement detection sensors 600 and 700, and the operating displacement of the valve operating member 400, which is detected from the lever displacement sensor 810, are different from each other, the control unit 800 gives priority to the operating displacement of the valve operating member 400, and adjust the voltage applied to the two piezo-electric actuators 200 and 300. As described above, the voltage applied to the two piezo-electric actuators 200 and 300 is adjusted according to an operating displacement of an output stage during a valve operation process, so that continuous quantitative discharge of the low hysteresis piezo-electric pump may be made possible.

In addition, the control unit 800 compares the operating displacements of the two piezo-electric actuators 200 and 300, which are calculated from of the pair of displacement detection sensors 600 and 700, with the operating displacement of the valve operating member 400, which is detected from the lever displacement sensor 810, to determine performance changes of the two piezo-electric actuators 200 and 300 or performance changes of elements disposed in connection between the two piezo-electric actuators 200 and 300 and the valve operating member 400. Specifically, when there is no performance change of the two piezo-electric actuators 200 and 300, it is determined that the performances of the elements are reduced. At this time, the operating displacements calculated from the displacement detection sensors 600 and 700 are converted and calculated into a size of a stroke enlarged by the lever 420 so as to correspond to the operating displacement detected by the lever displacement sensor 810. In addition, the operating displacements of the displacement detection sensors 600 and 700 calculated as described above coincide with or are proportional to the operating displacement of the lever displacement sensor 810.

When the performance of the two piezo-electric actuators 200 and 300 deteriorates and it is difficult to adjust the operating displacement of the valve operating member 400 only by adjusting the applied voltage, a user replaces the two piezo-electric actuators 200 and 300 for continuous quantitative discharge may make this possible. If the performance of the two piezo-electric actuators 200 and 300 is not degraded or is below permissible values, continuous quantitative discharge may be enabled by checking and replacing associated components. For example, a liquid discharge amount by the valve operating member 400 may be adjusted to a reference set value through a method such as adjusting an amount of tightening for coupling parts (position controllers 210 and 310) between the pump body 100 and the valve body 500, reassembling after separating the pump body 100 and the valve body 500, or reassembling after separating the lever 420 and the valve rod 430.

Hereinafter, an operation of the low hysteresis piezo-electric pump according to an embodiment configured as described above will be described.

First, in a state in which the pump body 100, the valve body 500 and other components are assembled, the control unit 800 applies a set voltage to the first piezo-electric actuator 200 and the second piezo-electric actuator 300. At this time, as illustrated in FIG. 3, the first piezo-electric actuator 200 and the second piezo-electric actuator 300 alternately stretch each other to the same length, and the lower end of each comes into contact with the lever 420.

In this state, the positions of the first piezo-electric actuator 200 and the second piezo-electric actuator 300 may be adjusted by the first position controller 210 and the second position controller 310. That is, the first position controller 210 or the second position controller 310 is rotated to move forward and backward the first piezo-electric actuator 200 and the second piezo-electric actuator 300 respectively, so that the lever 420 may be in a horizontal state.

After initial positions of the first piezo-electric actuator 200 and the second piezo-electric actuator 300 for dispensing are set through the above process, the liquid is supplied to the reservoir 510 through the inlet 520 at a constant pressure. Then, a process of dispensing the liquid supplied to the reservoir 510 is started.

When a voltage is applied to the first piezo-electric actuator 200, the first piezo-electric actuator 200 is stretched. When a voltage of opposite polarity is applied to the second piezo-electric actuator 300, the second piezo-electric actuator 300 contracts. At this time, based on FIG. 3, the lever 420 is rotated clockwise, and the valve rod 430 is raised.

Again, when opposite voltages are applied to the first piezo-electric actuator 200 and the second piezo-electric actuator 300, the first piezo-electric actuator 200 contracts and the second piezo-electric actuator 300 extends. At this time, the lever 420 rotates counterclockwise, and the valve rod 430 descends. The valve rod 430 descending from the reservoir 510 presses the liquid inside the reservoir 510 and discharges the liquid to the outside through the nozzle 530, thereby dispensing the liquid.

As such, when voltage is alternately applied to the first piezo-electric actuator 200 and the second piezo-electric actuator 300, the valve rod 430 is repeatedly raised and lowered, and the liquid is continuously dispensed through the nozzle 530. Since the distance between the hinge axis 410 and the valve rod 430 is much larger than the distance between the hinge axis 410 and the first piezo-electric actuator 200 and the distance between the hinge axis 410 and the second piezo-electric actuator 300, the amount of deformation of the piezo-electric actuators 200 and 300 is sufficiently enlarged by the lever 420, so that the valve rod 430 may be operated within a sufficient height.

The control unit 800, which controls the operations of the first piezo-electric actuator 200 and the second piezo-electric actuator 300, applies voltages with various types of pulse waveforms to the first piezo-electric actuator 200 and the second piezo-electric actuator 300 over time, thereby dynamic characteristics of the valve rod 430 may be controlled. In particular, since the two piezo-electric actuators 200 and 300 are configured to operate the lever 420 with the hinge axis 410 interposed therebetween, not only a downward movement but also an upward movement of the valve rod 430 may be controlled. In addition, the liquid may be dispensed more quickly, and the amount of the liquid dispensed may be precisely controlled.

In particular, the control unit 800 may accurately control mechanical operation characteristics of the first piezo-electric actuator 200 and the second piezo-electric actuator 300 in an electrical manner by using control parameters such as magnitude of applied voltage, alternating frequency of voltage, and amount of change with time of voltage. As a result, the improvement of the control performance for the operation of the valve rod 430 makes it possible to easily and accurately control the dispensing characteristics of the dispensed liquid.

The piezo-electric actuators 200 and 300 generate relatively much heat during use due to their characteristics. If the temperature of the piezo-electric actuators 200 and 300 rises due to the heat generated by the piezo-electric actuators 200 and 300, the operating characteristics may deteriorate.

Despite the change in characteristics of the piezo-electric actuators 200 and 300 according to the temperature rise, the low hysteresis piezo-electric pump according to the present disclosure may maintain the operating displacement of the valve operating member 400 constant. The control unit 800 detects the amount of deformation of the piezo-electric actuators 200 and 300 through the displacement detection sensors 600 and 700 such as the strain gauge installed on the piezo-electric actuators 200 and 300 and correct the amount of deformation of the piezo-electric actuators 200 and 300 by adjusting the applied voltage. The control unit 800 may adjust the voltage applied to the piezo-electric actuators 200 and 300 by receiving the measured values of the displacement detection sensors 600 and 700 as feedback in real time. In addition, the control unit 800 may control the applied voltage to the piezo-electric actuators 200 and 300 while also monitoring the measured value of the lever displacement sensor 810, comparing and matching the measured values of the displacement detection sensors 600 and 700 with the measured value of the lever displacement sensor 810. By this method, in the case of the present disclosure, the dispensing performance of the viscous liquid may be constantly maintained despite the characteristic change due to the cause such as the temperature change of the piezo-electric actuators 200 and 300. In particular, even in the case of the present disclosure, the correspondence between the operating displacement and the applied voltage of the piezo-electric actuators 200 and 300 is not linear, or the change in the amount of deformation according to the applied voltage of the piezo-electric actuators 200 and 300 is appeared as a hysteresis curve, a lifting displacement of the valve rod 430 may be kept constant. This is a more direct method than cooling the piezo-electric actuators 200 and 300, and at the same time, it is a method that may compensate the operating displacement of the valve rod 430 more immediately and quickly, thus more effective in maintaining the quality of the dispensing process of the viscous liquid.

As such, instead of measuring the amount of deformation of each pair of piezo-electric actuators 200 and 300 and adjusting the operating displacement individually, the control unit 800 may adjust the voltage applied to the pair of piezo-electric actuators 200 and 300, so that a sum of the displacement measured values detected by each of the pair of displacement detection sensors 600 and 700 is maintained as a reference set value. For example, a sum of a distance that the valve rod 430 moves up because the first piezo-electric actuator 200 is stretched and a distance that the valve rod 430 moves down because the second piezo-electric actuator 300 is stretched becomes a lifting displacement of the valve rod 430 as a whole, and the lifting displacement of the valve rod 430 is a direct factor of a viscous liquid discharge capacity, so that the control unit 800 may operate the piezo-electric actuators 200 and 300 to constantly maintain such a value. That is, the control unit 800 adjusts the applied voltage using a sum of a length of the first piezo-electric actuator and a length of the second piezo-electric actuator 300. In some cases, it is possible to operate the control unit 800 by using a sum of a length of the first piezo-electric actuator 200 increased and a length of the second piezo-electric actuator 300 contracted.

Above, although a preferred example has been described for present disclosure, the scope of present disclosure is not limited to the form described and illustrated above.

For example, although the low hysteresis piezo-electric pump equipped with the pair of piezo-electric actuators 200 and 300 and the pair of displacement detection sensors 600 and 700 has been described above as an example, the number of piezo-electric actuators 200 and 300 and the number of displacement detection sensors may vary widely. For example, a low hysteresis piezo-electric pump including one piezo-electric actuator and one displacement detection sensor may be implemented. In this case, a lever and a valve rod are operated in conjunction with the extension and contraction of one piezo-electric actuator.

In addition, although the low hysteresis piezo-electric pump having the lever displacement sensor 810 has been described above as an example, a low hysteresis piezo-electric pump without a lever displacement sensor 810 may be implemented in some cases. In this case, a control unit operates a piezo-electric actuator by referring only to a measured value of a displacement detection sensor.

In addition, the structures of the pump body 100 and the valve operating member 400 may also be changed to various structures other than the structures described and illustrated above.

The low hysteresis piezo-electric pump of the present disclosure may maintain accurate viscous liquid discharge characteristics by adjusting the applied voltage in response to changes in the behavioral characteristics of the piezo-electric actuator depending on causes such as the temperature change.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A low hysteresis piezo-electric pump comprising:
   a pump body;
   a valve operating member comprising a lever installed to be rotatable with respect to a hinge axis installed on the pump body, and a valve rod connected to the lever to move up and down according to the rotation of the lever;
   a pair of piezo-electric actuators installed in parallel with each other on the pump body with the hinge axis interposed therebetween and each having an end portion contactable with the lever, wherein the pair of piezo-electric actuators lengthen and press the lever when voltage is applied to rotate the lever about the hinge axis;
   a valve body comprising a reservoir into which an end portion of the valve rod is inserted and a liquid is stored, an inlet through which the liquid is introduced into the reservoir, and a nozzle through which the liquid of the reservoir is discharged according to a forward/backward movement of the valve rod in the reservoir;
   a pair of displacement detection sensors respectively installed in the pair of piezo-electric actuators to detect operating displacements of the pair of piezo-electric actuators; and
   a control unit electrically connected to the pair of piezo-electric actuators and the pair of displacement detection sensors to apply the voltage to operate the pair of piezo-electric actuators and to receive detection signals on the operating displacements of the pair of piezo-electric actuators from the pair of displacement detection sensors,
   wherein the control unit applies the voltage to each of the pair of piezo-electric actuators so that the pair of piezo-electric actuators alternately stretch and contract, and
   wherein the control unit changes the voltage applied to the pair of piezo-electric actuators so that a sum of the displacement measured values on respectively detected by the pair of displacement detection sensors is maintained as a reference set value.

2. The low hysteresis piezo-electric pump of claim 1, wherein the control unit adjusts the operating displacements of the pair of piezo-electric actuators to a preset reference set value by changing the voltage applied to the pair of piezo-electric actuators, when the operating displacements of the pair of piezo-electric actuators received from the pair of displacement detection sensors are different from the preset reference set value.

3. The low hysteresis piezo-electric pump of claim 2, wherein the control unit receives measured values of the pair of displacement detection sensors and controls the voltage applied to the pair of piezo-electric actuators in real time.

4. The low hysteresis piezo-electric pump of claim 1, further comprising a lever displacement sensor installed on the pump body to detect an operating displacement of the valve operating member.

5. The low hysteresis piezo-electric pump of claim 1, wherein the pair of displacement detection sensors comprise strain gauges.

* * * * *